UNITED STATES PATENT OFFICE.

SAMUEL CABOT, OF CANTON, MASSACHUSETTS.

VARNISH COMPOSITION FOR CEMENT FLOORS.

1,094,118. Specification of Letters Patent. Patented Apr. 21, 1914.

No Drawing. Application filed May 15, 1912. Serial No. 697,445.

*To all whom it may concern:*

Be it known that I, SAMUEL CABOT, a citizen of the United States, residing at Canton, in the county of Norfolk and State of Massachusetts, have invented an Improvement in Varnish Compositions for Cement Floors, of which the following is a specification.

This invention relates to a varnish composition especially well suited as a coating for cement floors, yet it may be employed for other purposes.

It is well known that cement floors, when dry, become dusty, unless painted or coated with a varnish composition of some sort. Ordinary paints and varnish compositions of commerce are not suitable for this purpose, for the reason that when dampness accumulates beneath the coating or layer which is applied to the surface of the cement floor said coating or layer peels off.

The varnish composition embodying this invention has the property of permitting the dampness to pass through it, thus adapting it to stick to a damp surface, and this capability is one of its chief characteristics.

As a substance or ingredient to give to my varnish composition the function or property of permitting the dampness to pass through it I prefer to employ short cellulose fibers such as ground wood, the normal fibrous condition or tubular structure of which is conserved, the fibers usually not being over one-sixteenth of an inch in length, yet I may employ short fibers of cotton, jute, hemp or flax, or some equivalent form of cellulose having tubular fibers. Ground wood cellulose is more available, in the short fibrous form which I wish to employ, than the other substances referred to, and is particularly well suited for the purpose, for the reason that the fibers are tubular and have a strong affinity for water and when incorporated in the varnish composition act as conveyers to conduct the dampness from the cement floor to the atmosphere. The ground wood may be produced by grinding and sifting sawdust. It will be understood, however, that for the achievement of the results that the normal fibrous condition of the cellulose must be conserved.

The varnish composition also includes a liquid conveyer and fixative for the ground wood or other finely divided fibrous cellulose, into which the latter is incorporated and thoroughly mixed.

As a liquid conveyer or binder I may employ any ordinary varnish of commerce, either of the oil, spirit, asphaltum or coal-tar variety.

When the short cellulose fibers are added to the liquid varnish material some difficulty is encountered in separating them and mixing them thoroughly into said material as they have a tendency to cling together and to remain massed together, resulting in the formation of lumps, and to assist in separating them and in regulating their disposition evenly throughout the mass of varnish material a pigment of some sort is added, such for instance as zinc oxid, which has a tendency to separate said fibers and to prevent them from commingling or massing together. Said zinc oxid or other pigment which may be employed in lieu thereof also serves as a base coloring material for the composition and enables the varnish composition to flow smoothly and lie evenly and also assists in giving to it wearing qualities, but its main usefulness in connection with my varnish composition is as a separating means for the short cellulose fibers.

One illustration is here given of a varnish composition embodying this invention, which is very efficient: varnish 100 pounds, zinc oxid 40 pounds, ground wood 5 pounds. These proportions, however, may be varied without departing from the spirit and scope of my invention.

The short fibrous cellulose, in addition to serving as a means of conducting the dampness, also gives to the coating additional wearing qualities, and some resiliency.

I claim:—

1. A flexible coating composition comprising a mixture of cellulose in fibrous form, varnish, and a fiber suspending and diffusing ingredient, the fibers being disposed to permit the passage of moisture through the composition by capillary action.

2. A flexible coating composition comprising a mixture of wood fibers, varnish, and zinc oxid, the fibers being arranged to permit the passage of moisture by capillary action.

In testimony whereof, I have signed my name to this specification, in the presence of two subscribing witnesses.

SAMUEL CABOT.

Witnesses:
 HORACE D. BRADFORD,
 CHARLES M. ABBOTT.

Copies of this patent may be obtained for five cents each, by addressing the "Commissioner of Patents, Washington, D. C."